United States Patent
Haneda

(10) Patent No.: US 8,478,984 B2
(45) Date of Patent: *Jul. 2, 2013

(54) DATA ENCRYPTION APPARATUS, DATA DECRYPTION APPARATUS, DATA ENCRYPTION METHOD, DATA DECRYPTION METHOD, AND DATA RELAY APPARATUS

(75) Inventor: Terumasa Haneda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1041 days.

This patent is subject to a terminal disclaimer.

(21) Appl. No.: 12/004,430

(22) Filed: Dec. 21, 2007

(65) Prior Publication Data

US 2008/0201574 A1     Aug. 21, 2008

(30) Foreign Application Priority Data

Feb. 15, 2007  (JP) .................. 2007-035433

(51) Int. Cl.
*H04L 29/06*     (2006.01)

(52) U.S. Cl.
USPC .......................... 713/153; 713/150

(58) Field of Classification Search
None
See application file for complete search history.

(56) References Cited

U.S. PATENT DOCUMENTS

| | | | | |
|---|---|---|---|---|
| 5,459,455 | A * | 10/1995 | Sato | 370/410 |
| 7,191,285 | B2 | 3/2007 | Scales et al. | |
| 7,529,366 | B2 * | 5/2009 | Ichinose et al. | 380/29 |
| 2006/0206754 | A1 | 9/2006 | Kakui | |

FOREIGN PATENT DOCUMENTS

| | | |
|---|---|---|
| JP | 5-37551 | 2/1993 |
| JP | 9-8797 | 1/1997 |
| JP | 2000-341328 | 12/2000 |
| JP | 2003-271460 | 9/2003 |
| JP | 2004-326759 | 11/2004 |
| JP | 3110572 | 5/2005 |
| JP | 2006-033350 | 2/2006 |
| JP | 2006-041684 | 2/2006 |
| JP | 2006-252328 | 9/2006 |
| JP | 2006-330126 | 12/2006 |

OTHER PUBLICATIONS

Japanese Office Action issued in corresponding Japanese Patent Application 2007-035433.
Kazusa Tomonaga, "Encrypted Disk Array RAID Subsystem", Toshiba Technical Releases, Japan, Kabushiki Kaisha Toshiba, May 24, 1999, vol. 17-30, p. 87-95.

* cited by examiner

*Primary Examiner* — Pramila Parthasarathy
(74) *Attorney, Agent, or Firm* — Staas & Halsey LLP

(57) ABSTRACT

A RAID system includes a RAID controller that sends to a disc apparatus data to be encrypted by a data relay apparatus connected to the RAID controller and the disk apparatus. When receiving a data transfer request packet indicating a first receivable size, the data relay apparatus establishes a second receivable size that is equal to or greater than the first receivable size and that is a multiple of an encryption data size. When the RAID controller receives a data transfer request packet containing the established second receivable size, and in response to the data transfer request packet thus received, the data relay apparatus receives data of the second receivable size sent from the RAID controller. The data relay apparatus also encrypts the received data in units of the encryption data size, and then the encrypted data is sent to the disk apparatus in units of the first receivable size.

8 Claims, 12 Drawing Sheets

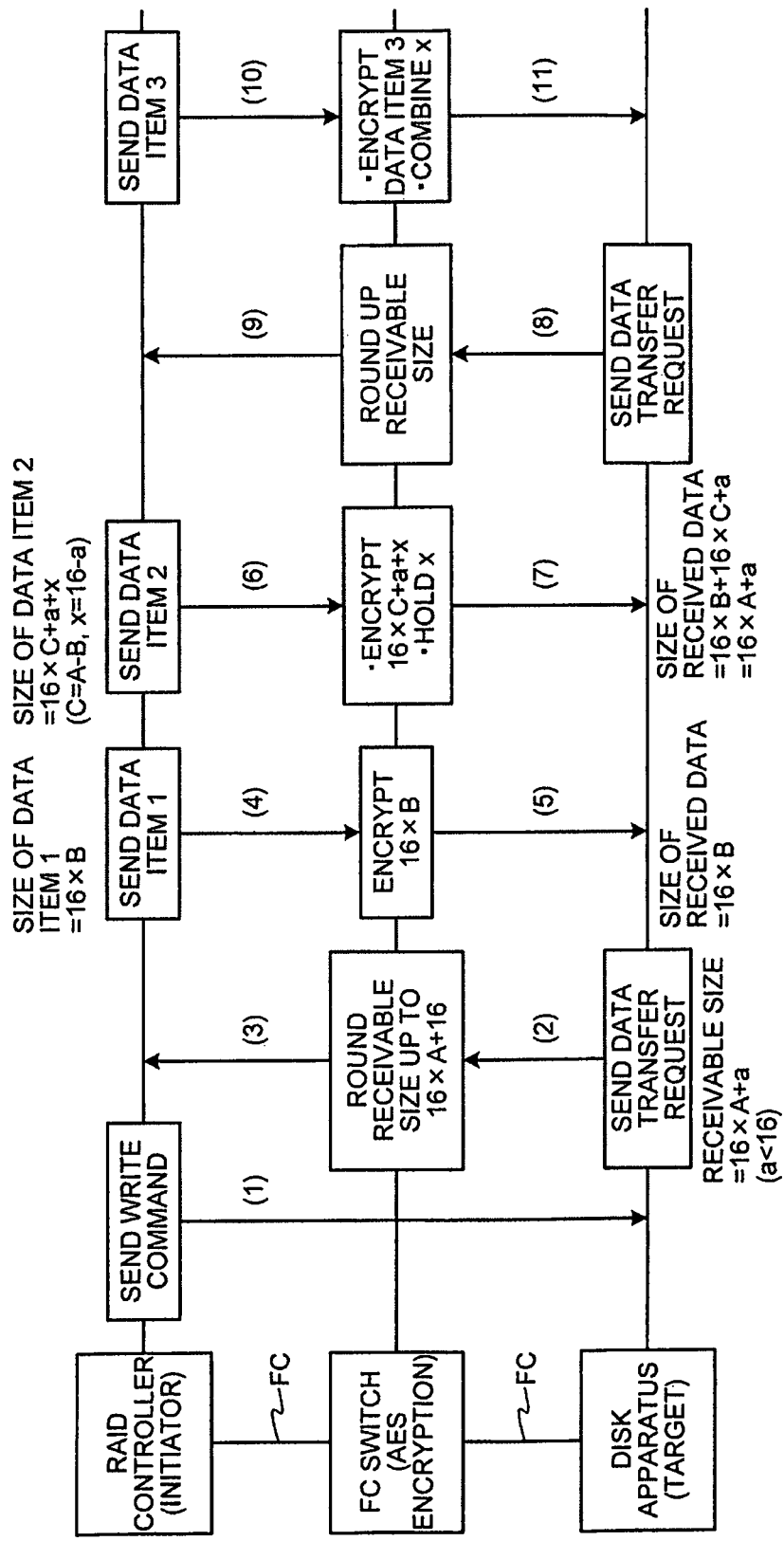

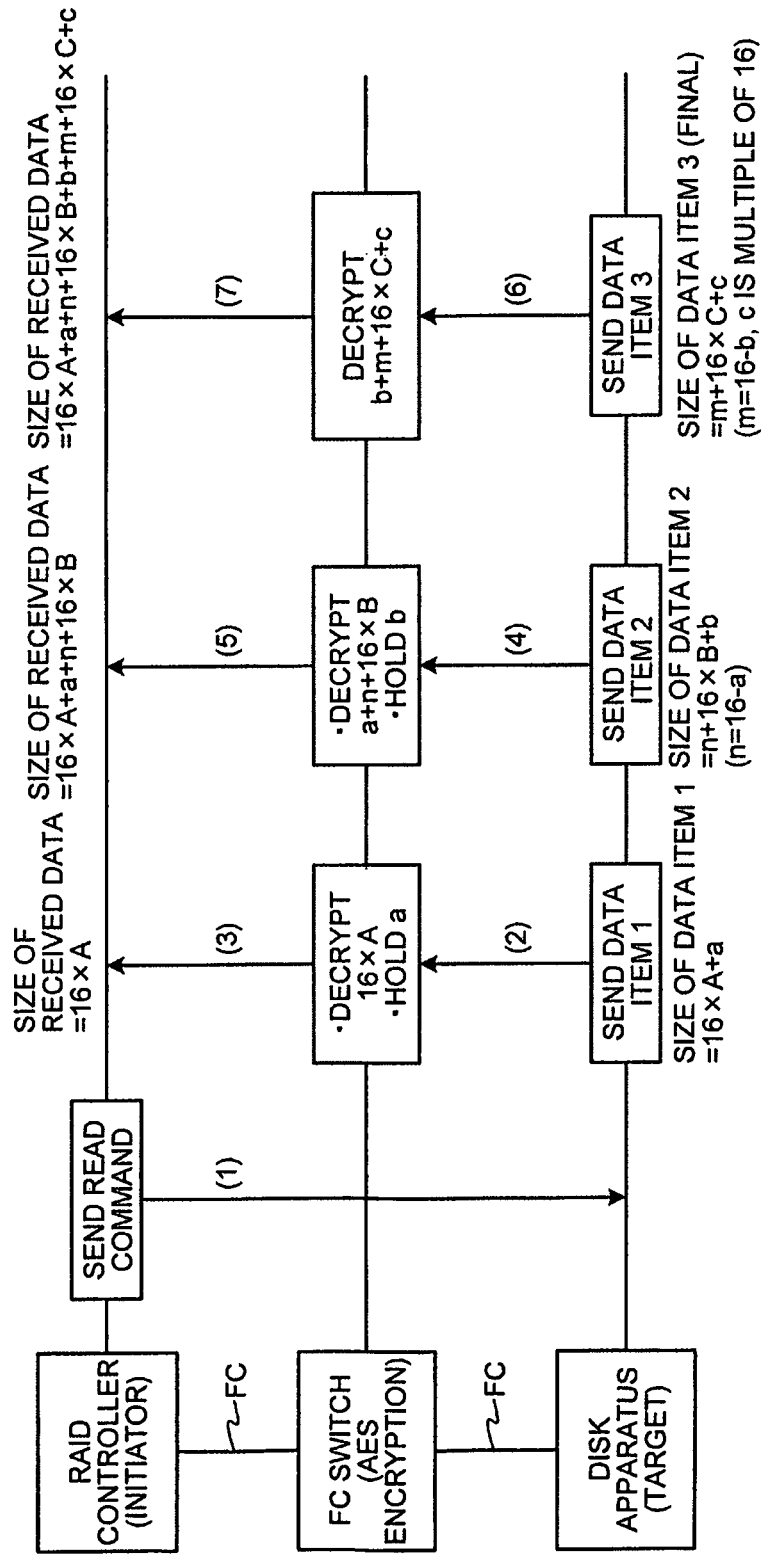

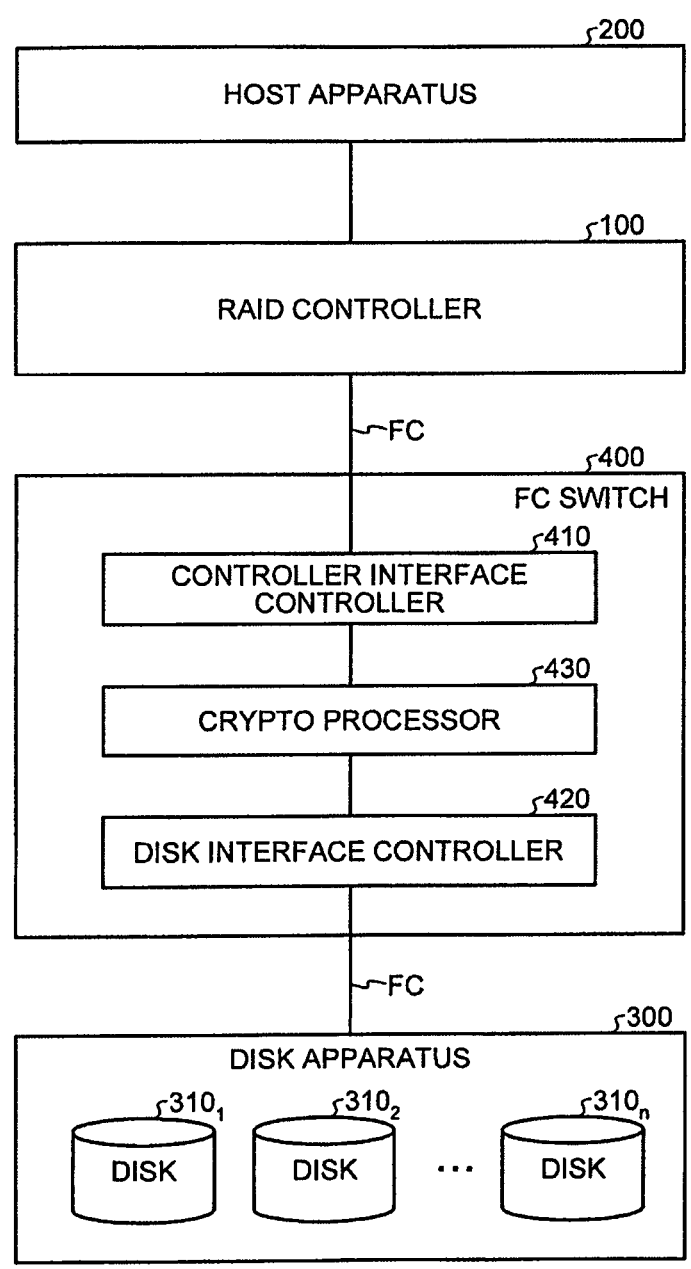

FIG.5

| Bits<br>Word | 31 ·· 24 | 23 ·· 16 | 15 ·· 08 | 07 ·· 00 |
|---|---|---|---|---|
| 0 | R_CTL | D_ID | | |
| 1 | CS_CTL/Priority | S_ID | | |
| 2 | TYPE | F_CTL | | |
| 3 | SEQ_ID | DF_CTL | SEQ_CNT | |
| 4 | OX_ID | | RX_ID | |
| 5 | Parameter | | | |

FIG.6

| Byte | Field(s) | |
|---|---|---|
| 0 | Frame Type | |
| 1 to 3 | Hashed Destination SAS address | |
| 4 | Reserved | |
| 5 to 7 | Hashed Source SAS address | |
| 8 to 9 | Reserved | |
| 10 | Reserved | Retransmit | Rsvd |
| 11 | Reserved | Number of Fill Bytes |
| 12 to 15 | Reserved | |
| 16 to 17 | Tag | |
| 18 to 19 | Target Port Transfer Tag | |
| 20 to 23 | Data Offset | |
| 24 to m | Information Unit | |
| m to (n-3) | Fill bytes, if needed | |
| (n-3) to n | CRC | |

DATA ENCRYPTION APPARATUS, DATA DECRYPTION APPARATUS, DATA ENCRYPTION METHOD, DATA DECRYPTION METHOD, AND DATA RELAY APPARATUS

BACKGROUND OF THE INVENTION

1. Field of the Invention

The present invention relates to a data encryption apparatus, a data decryption apparatus, a data encryption method, a data decryption method, and a data relay apparatus that encrypt and decrypt data transferred between a first apparatus and a second apparatus. The present invention particularly relates to a data encryption apparatus, a data decryption apparatus, a data encryption method, a data decryption method, and a data relay apparatus that are capable of encrypting and decrypting data without interrupting data transfer, even when a data size as a unit for data transfer differs from a data size as a unit for crypto processing.

2. Description of the Related Art

Conventionally, in magnetic disk devices, optical disk devices, and other memory devices, data is encrypted when recorded in storage media (such as magnetic disks and optical disks) or when transmitted to and received from a host apparatus of a network system such as a host computer, for the purpose of preventing information leakage due to theft and unauthorized access. Conventional technologies have been disclosed in, for example, Japanese Patent Applications Laid-Open No. 2003-271460 and No. 2006-41684.

In a computer network system, a typical RAID system (redundant array of inexpensive disks) is well known. The RAID system includes, for example, a disk apparatus of a plurality of disks as storage media, a high-level apparatus that requests to read and write data from and to the disk apparatus, and a RAID controller that controls data input and output to and from the disk apparatus based on the request from the high-level apparatus.

FIGS. 11A and 11B are schematics showing an example of a conventional RAID system. As shown in the schematics, the RAID system includes a RAID controller 10, a host apparatus 20 serving as the high-level apparatus, and a disk apparatus 30. The RAID controller 10 is connected in between the host apparatus 20 and the disk apparatus 30.

The RAID controller 10 includes a host interface controller 11, a main memory 12, a memory controller 13, a central processing unit (CPU) 14, and a disk interface controller 15, as shown in FIGS. 11A and 11B.

The function units will now be briefly described. The host interface controller 11 controls data transfer to and from the host apparatus 20. The main memory 12 includes a cache area used as a cache memory.

The memory controller 13 controls reading and writing data from and to the main memory 12. The CPU 14 is a central processing unit that implements firmware that controls the entire RAID controller 10. The disk interface controller 15 controls data transfer to and from the disk apparatus 30.

Referring to FIGS. 11A and 11B, an operation performed by the RAID controller 10 is briefly described. The following describes an operation performed when a write request is received from the host apparatus 20 (hereinafter, "write operation"), and an operation performed when a read request is received from the host apparatus 20 (hereinafter, "read operation").

In write operation, as shown in FIG. 11A, when a write request is sent from the host apparatus 20 (reference numeral (1) in FIG. 11A), the host interface controller 11 receives data sent together with the write request, and passes it to the memory controller 13. The memory controller 13 sequentially stores the received data in the cache area of the main memory 12 (reference number (2) in FIG. 11A). The disk interface controller 15 reads out the data from the cache area via the memory controller 13 (reference numeral (3) in FIG. 11A), and transfers it to the disk apparatus 30 (reference numeral (4) in FIG. 11A).

In read operation, on the other hand, as shown in FIG. 11B, when a read request is sent from the host apparatus 20 (reference numeral (1) in FIG. 11B), the disk interface controller 15 reads out from the disk apparatus 30 data requested in the read request (reference numeral (2) in FIG. 11B), and passes it to the memory controller 13. The memory controller 13 sequentially stores the received data in the cache area of the main memory 12 (reference numeral (3) in FIG. 11B). Then, the host interface controller 11 reads out the data from the cache area via the memory controller 13 (reference numeral (4) in FIG. 11B), and transfers it to the host apparatus 20 (reference numeral (5) in FIG. 11B).

In such a RAID system, crypto processing (encryption and decryption) is performed on data to be stored in the disk apparatus 30 by the RAID controller 10 in general.

The crypto processing is possibly performed on data transferred between the host apparatus 20 and the main memory 12 and data transferred between the main memory 12 and the disk apparatus 30.

As to the data transferred between the host apparatus 20 and the main memory 12, data to be stored in the main memory 12 is all encrypted. Thus, the data stored in the main memory 12 needs to be decrypted every time it is referred to by the firmware for processing, which means low process efficiency.

Thus, when the RAID controller 10 performs the crypto processing on data to be stored in the disk apparatus 30, it is practical to perform the crypto processing while the data is being transferred between the main memory 12 and the disk apparatus 30.

Such crypto processing is generally realized by embedding processes of the crypto processing in the firmware. The following briefly describes typical crypto processing performed by the firmware.

In write operation, when a write request is sent from the host apparatus 20, the host interface controller 11 receives data sent together with the write request, and passes it to the memory controller 13. The memory controller 13 sequentially stores the received data in the cache area of the main memory 12. The firmware controls the memory controller 13 to sequentially read out the data from the cache area, encrypt it, and save the encrypted data in a save area that is different from the cache area in the main memory 12. Then the disk interface controller 15 reads out the encrypted data from the save area via the memory controller 13, and transfers it to the disk apparatus 30.

In read operation, when a read request is sent from the host apparatus 20, the disk interface controller 15 reads out from the disk apparatus 30 data requested in the read request, and passes it to the memory controller 13. The memory controller 13 sequentially stores the received data in the cache area of the main memory 12. The firmware controls the memory controller 13 to sequentially read out the data stored in the cache area, decrypt it, and save the decrypted data in the save area that is different from the cache area of the main memory 12. The host interface controller 11 reads out the decrypted data from the save area via the memory controller 13, and transfers it to the host apparatus 20.

Accordingly, the firmware performs the crypto processing on data transferred between the main memory 12 and the disk apparatus 30, enabling to encrypt data to be stored in the disk apparatus 30.

Causing the firmware to perform the crypto processing, however, requires the save area to save data temporally before and after the crypto processing as described. This poses a problem of increasing the capacity of a memory (main memory or other memory) to be installed in the RAID controller 10. The increase in memory capacity leads to a cost increase in the RAID controller 10.

In this arrangement, data input and output to and from the disk apparatus always require the crypto processing to be performed by the firmware, which results in an increase in response time for data input and output. Further, because the firmware performs the crypto processing, an increased load is placed on the CPU of the RAID controller 10, causing an increased busy ratio of the disk controlling apparatus and requiring heavy traffic of a main memory bus for the crypto processing. Consequently, the overall RAID system performance declines.

Considering this, suppose the RAID controller 10 is arranged such that an encryption chip capable of realizing encryption and decryption functions by hardware, such as an integrated circuit, is used to perform the crypto processing on data to be stored in the disk apparatus 30, without causing the firmware to perform the crypto processing.

In this arrangement, for example, a data relay apparatus including an encryption chip is connected to and shared between the RAID controller 10 and the disk apparatus 30. The data relay apparatus encrypts data to be transferred from the RAID controller 10 to the disk apparatus 30, and decrypts data to be transferred from the disk apparatus 30 to the RAID controller 10.

This allows the RAID controller 10 not to have the data save area, enabling to solve the problems of the cost increase and processing degradation arising from the crypto processing performed by the firmware.

When the data relay apparatus performs the crypto processing, however, such a problem may occur that data cannot be transferred depending on the type of an interface connecting the RAID controller and the disk apparatus and the format type of the crypto processing used in the encryption chip. This problem is described in detail below.

For example, the following concerns a Fibre Channel (FC) or a Serial Attached SCSI (SAS) used as the data transfer interface connecting the RAID controller and the disk apparatus. In the FC and SAS, data is transferred in units of a size of a multiple of 4 bytes (32 bits), and the data is transferred using a protocol in a Small Computer System Interface (SCSI) specification.

To begin with, data transfer in the SCSI is described. In the SCSI, one side requesting data transfer is referred to as an initiator, and the other side providing data is referred to as a target.

For example, the following describes data transfer from the initiator to the target. FIG. 12 is a schematic diagram for explaining data transfer in the SCSI. As shown in FIG. 12, the initiator sends to the target a write command packet including a write command set therein (reference numeral (1) in FIG. 12).

The target, when receiving the write command packet, sends to the initiator a data transfer request packet in which a receivable size is defined. Based on the receivable size, the initiator sends to the target a data packet with write data set therein.

In the SCSI, an upper limit is defined for a receivable size that can be set in a single data transfer request packet and a data size that can be set in a single data packet. Thus, when transfer data is relatively large in size, the data is split into a plurality of data transfer packets or data packets based on the upper limit and then transferred.

For example, as shown in FIG. 12, the target sends to the initiator a data transfer request packet specifying receivable size as A (reference numeral (2) in FIG. 12). In response, the initiator sends to the target a data packet including a data item 1 with a data size of B bytes and a data packet including a data item 2 with a data size of C bytes (reference numerals (3) and (4) in FIG. 12). Note that C=A−B.

The target, every time it receives the data packet, sums up the size of the received data. When receiving from the initiator data of the receivable size set in the data transfer request packet thus sent, the target sends the next data transfer request packet to the initiator.

For example, as shown in FIG. 12, when receiving from the initiator the data packet including the data item 1 and the data packet including the data item 2, the target sends the next data transfer request packet to the initiator because the size of the received data items becomes B+C=A bytes (reference numeral (5) in FIG. 12).

As such, in the SCSI, the target does not send the next data transfer request packet until it receives from the initiator data of a receivable size set in the data transfer packet thus sent.

Considering such features of the SCSI, the problems with the crypto processing performed by the data relay apparatus are described in detail. FIG. 13 is a schematic diagram for explaining the problems with the crypto processing performed by the data relay apparatus.

For example, as shown in FIG. 13, a RAID controller and a disk apparatus, connected via FC, are connected to a FC switch shared in between. Further, the FC switch performs crypto processing according to the advanced encryption standard (AES). In this arrangement, the RAID controller is the initiator, and the target is the disk apparatus.

The following describes write operation in which data is transferred from the RAID controller to the disk apparatus. As shown in FIG. 13, in write operation, the RAID controller sends a write command packet to the disk apparatus via the FC switch (reference numeral (1) in FIG. 13).

The disk apparatus, when receiving the write command packet, sends a data transfer request packet including a receivable size of 16×A+a bytes (A and a are integral numbers equal to or greater than 0) to the RAID controller via the FC switch (reference numeral (2) in FIG. 13). Note that a<16.

The RAID controller, when receiving the data transfer request packet, sends to the FC switch a data packet including a data item 1 with a data size of 16×B bytes (B is an integral number equal to or greater than 0) (reference numeral (3) in FIG. 13).

The FC switch, when receiving the data packet, encrypts according to the AES the data item 1 included in the data packet. Because data is encrypted in units of 16 bytes (128 bits) in the AES, the FC switch can encrypt the entire data item 1, and sends to the disk apparatus a data packet including the encrypted data item 1 (reference numeral (4) in FIG. 13).

The disk apparatus receives the data packet sent from the FC switch, and writes the data item 1 included in the received data packet to disks serving as storage media. Thereupon, the accumulated size of the received data in the disk apparatus becomes 16×B bytes.

Subsequently, the RAID controller sends to the FC switch a data packet including the data item 2 with a data size of 16×C+a bytes (C and a are integral numbers equal to or greater than 0) (reference numeral (5) in FIG. 13). Note that C=A−B.

The FC switch encrypts only a portion of the data item 2 included in the received data packet, i.e., data of 16×C bytes. As a result, a-byte data below 16 bytes remains without being encrypted. The possible process performed by the FC switch here is either sending no data to the disk apparatus because the entire data has not been encrypted (reference numeral (6) in FIG. 13), or sending to the disk apparatus a data packet including the encrypted data of 16×C bytes (reference numeral (7) in FIG. 13).

In either case, the accumulated size of the received data does not become the receivable size set in the data transfer request packet, i.e., 16×A+a bytes. Thus, the disk apparatus cannot send the next transfer request packet (reference numeral (8) in FIG. 13).

As such, in data transfer via FC and SAS, when a data size as a unit for data transfer differs from a data size as a unit for crypto processing, the data transfer is interrupted before the data to be transferred from the RAID controller to the disk apparatus is all transferred.

This poses a significant issue regarding how to perform encryption and decryption without interrupting data transfer, even when a data size as a unit for data transfer differs from a data size as a unit for crypto processing.

SUMMARY OF THE INVENTION

It is an object of the present invention to at least partially solve the problems in the conventional technology.

According to an aspect of the present invention, a data encryption apparatus for encrypting, in a unit of a predetermined encryption data size, data transferred from a first apparatus to a second apparatus, includes a transfer request sending unit that establishes, upon receiving from the second apparatus a first data transfer request indicating a first receivable size, a second receivable size being equal to or greater than the first receivable size and being a multiple of the predetermined encryption data size, and that sends to the first apparatus a second data transfer request indicating the second receivable size thus established; a data encrypting unit that receives data of the second receivable size from the first apparatus in response to the second data transfer request sent by the transfer request sending unit, and that encrypts, in the unit of the predetermined encryption data size, the data received from the first apparatus; and a data sending unit that sends the data encrypted by the data encrypting unit to the second apparatus in units of the first receivable size, and that combines unsent data below the first receivable size remaining as a result of transmission with data subsequently encrypted by the data encrypting unit, so as to send the combined data to the second apparatus.

According to another aspect of the present invention, a data decryption apparatus for decrypting, in a unit of a predetermined decryption data size, encrypted data transferred from a second apparatus to a first apparatus, includes a data decrypting unit that decrypts the encrypted data in the unit of the predetermined decryption data size, and that combines data below the predetermined decryption data size remaining as a result of decryption with encrypted data subsequently sent from the second apparatus, so as to decrypt the combined data in units of the decryption data size; and a data sending unit that sends to the first apparatus the data decrypted by the data decrypting unit.

According to still another aspect of the present invention, a data encryption method for encrypting, in a unit of a predetermined encryption data size, data transferred from a first apparatus to a second apparatus, includes: establishing, upon receiving from the second apparatus a first data transfer request indicating a first receivable size, a second receivable size being equal to or greater than the first receivable size and being a multiple of the predetermined encryption data size; sending to the first apparatus a second data transfer request indicating the second receivable size thus established; receiving data of the second receivable size from the first apparatus in response to the second data transfer request; encrypting, in the unit of the predetermined encryption data size, the data received from the first apparatus; sending the encrypted data to the second apparatus in units of the first receivable size; and combining unsent data below the first receivable size remaining as a result of transmission with data subsequently encrypted, so as to send the combined data to the second apparatus.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a schematic diagram for explaining an overview of a FC switch in write operation according to one embodiment of the present invention;

FIG. 2 is a schematic diagram for explaining an overview of the FC switch in read operation according to the present embodiment;

FIG. 4 is a functional block diagram of a structure of the FC switch according to the present embodiment;

FIG. 5 is a diagram schematically explaining the format of a FC frame header;

FIG. 6 is a diagram schematically explaining the format of an SAS frame header;

DETAILED DESCRIPTION OF THE PREFERRED EMBODIMENTS

An exemplary embodiment of a data encryption apparatus, a data decryption apparatus, a data encryption method, a data decryption method, and a data relay apparatus according to the present invention will be described in detail with reference to the accompanying drawings. The present embodiment describes an arrangement that the present invention is applied to a FC switch.

Figure 13:
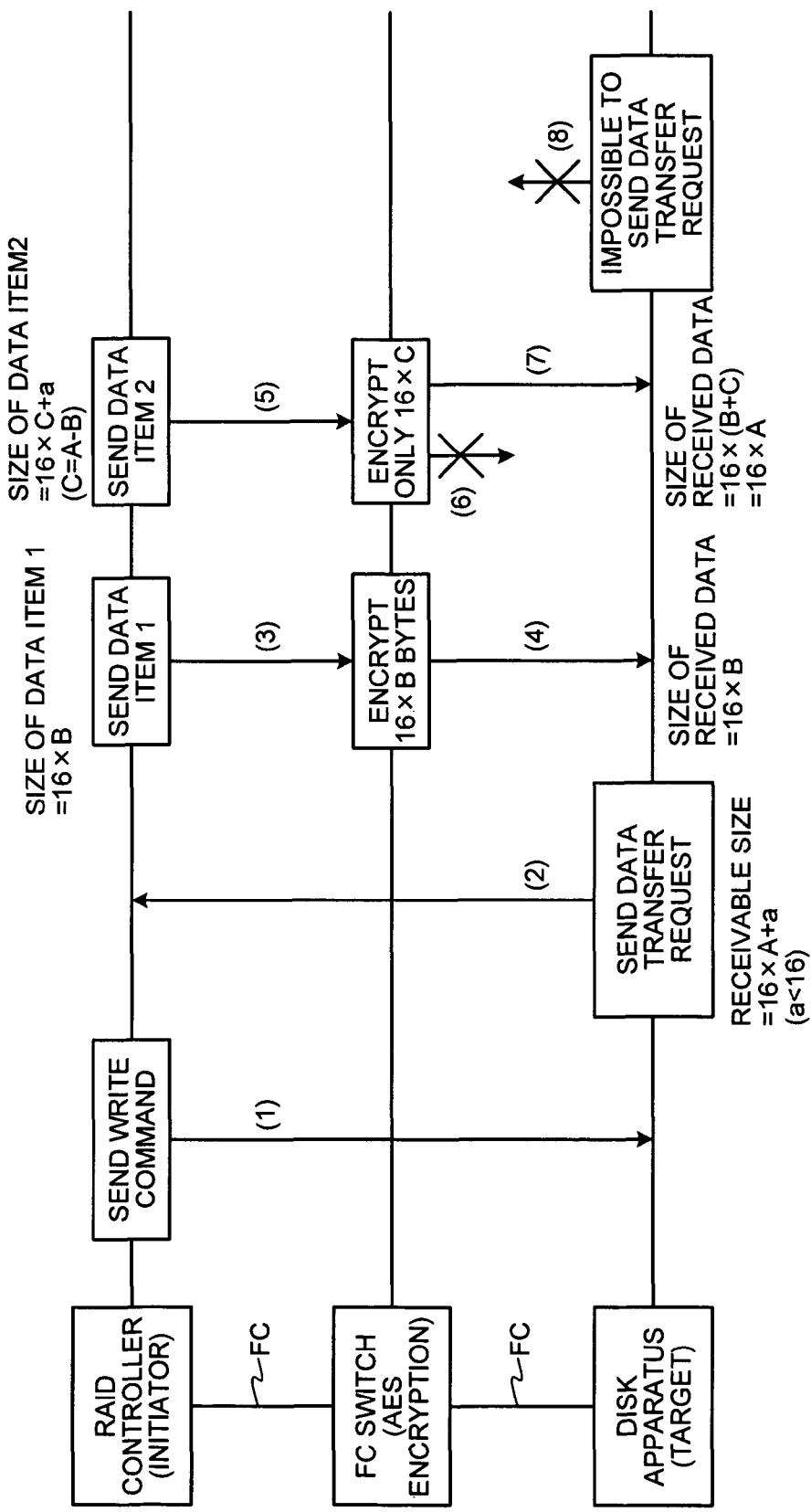
FIG. 13 is a schematic diagram for explaining problems with crypto processing performed by a data relay apparatus.

The following describes an overview of a FC switch according to the present embodiment. FIGS. 1 and 2 are schematic diagrams for explaining an overview of a FC switch according to the present embodiment. FIG. 1 depicts an arrangement that the present invention is applied to the FC switch explained in FIG. 13.

As shown in FIGS. 1 and 2, the FC switch according to the present embodiment is an apparatus that relays data exchanged between a RAID controller and a disk apparatus, and that encrypts and decrypts the data. The FC switch has such a main feature as being capable of encryption and decryption without interrupting the data transfer even when a data size as a unit for data transfer differs from a data size as a unit for crypto processing.

This feature is described in detail. In write operation, as shown in (1) to (6) of FIG. 1, the RAID controller sends a write command packet, then the disk apparatus sends a data transfer request packet, and in response, the RAID controller sends to the disk apparatus a data packet including a data item 1 and a data packet including a data item 2. While these processes are the same as those shown in (1) to (5) of FIG. 13, a difference lies in that the FC switch sets a new receivable size in the data transfer request packet sent from the disk apparatus, and then sends the data transfer request packet to the RAID controller.

Specifically, with respect to the data transfer request packet sent from the disk apparatus, the FC switch specifies the new receivable size that is equal to or greater than the receivable size having been set in the data transfer request packet, and that is a multiple of a data size as a unit for processing in the AES, i.e., a multiple of 16 bytes. The FC switch then sends the data transfer request packet to the RAID controller.

For example, when receiving a data transfer request packet including a receivable size of 16×A+a, the FC switch specifies a new receivable size of 16×A+16 bytes with respect to the data transfer request packet (reference numeral (3) in FIG. 1).

Accordingly, the size of the data to be transferred from the RAID controller to the FC switch becomes a multiple of 16 bytes. This allows the FC switch, when encrypting the data according to the AES, to encrypt the entire data without leaving data below 16 bytes.

For example, because the receivable size set in the data transfer request packet is increased to 16×A+16 bytes, the RAID controller sends to the FC switch a data packet including a data item 2 with a size of 16×C+a+x bytes, where x=16−a (reference numeral (6) in FIG. 1). Accordingly, the size of the data item 2 becomes a multiple of 16 bytes because a+x=16.

The FC switch encrypts the entire data item 2, sends to the disk apparatus a data packet including data of 16×C+a bytes out of the encrypted data, and stores the x-byte data in its internal memory (reference numeral (7) in FIG. 1).

The disk apparatus writes the data included in the data packet sent from the FC switch to the disks serving as storage media. Thereupon, the accumulated size of the data received at the disk apparatus becomes 16×B+16×C+a=16×A+a, i.e., the same size as the receivable size set in the data transfer request packet. This allows the disk apparatus to send the next data transfer request packet (reference numeral (8) in FIG. 1).

Then, the FC switch performs the same processes as those subsequent to the operation of (3) of FIG. 1. Specifically, the FC switch, when receiving a data packet from the RAID controller in response to the data transfer request packet subsequently sent from the disk apparatus (reference numeral (10) in FIG. 1), encrypts data included in the data packet, combines the encrypted data with the unsent encrypted data held in the internal memory (x-byte data), and sends to the disk apparatus a data packet including the combined data (reference numeral (11) in FIG. 1). Thereafter, the disk apparatus, the FC switch, and the RAID controller perform the same processes as those subsequent to the operation of (6) of FIG. 1.

As such, when the FC switch according to the present embodiment receives from the disk apparatus a data transfer request packet containing information of a first receivable size indicating a receivable data size, the FC switch establishes a second receivable size that is equal to or greater than the first receivable size, and that is a multiple of an encryption data size (data size as a unit for processing in the AES). Then, the FC switch sends to the RAID controller a data transfer request packet containing the second receivable data size thus established. Further, the FC switch receives from the RAID controller data of the second receivable size in response to the data transfer request packet thus sent, encrypts the received data in units of the encryption data size, and sends to the disk apparatus the encrypted data in units of the first receivable size. If unsent data below the first receivable size remains as a result of transmission, the FC switch combines the unsent data with data subsequently encrypted, so as to send a data packet containing the combined data to the disk apparatus.

In this way, data of the first receivable size specified in the data transfer request packet is transferred to the disk apparatus, so that the disk apparatus can send the next data transfer request packet. Thus, as in the FC, SAS, and AES, even when a data size as a unit for data transfer differs from a data size as a unit for crypto processing, encryption can be performed without interrupting data transfer.

On the other hand, in read operation in which data is transferred from the disk apparatus to the RAID controller, the RAID controller sends a read command packet to the disk apparatus via the FC switch as shown in FIG. 2 (reference numeral (1) in FIG. 2).

The disk apparatus, when receiving the read command packet, sends to the FC switch a data packet including a data item 1 with a data size of 16×A+a bytes (A and a are integral numbers equal to or greater than 0) (reference numeral (2) in FIG. 2). Note that a<16.

The FC switch, when receiving the data packet, decrypts according to the AES data included in the data packet. Because data is decrypted in units of 16 bytes (128 bits) in the AES, the FC switch decrypts the received data in units of 16 bytes. If data below 16 bytes remains, the FC switch stores the remaining data in its internal memory.

Specifically, the FC switch decrypts data of 16×A bytes out of the data item 1, and stores the remaining a-byte data in its internal memory. The FC switch then sends the decrypted data to the RAID controller (reference numeral (3) in FIG. 2).

The disk apparatus, when receiving the data packet from the RAID controller, stores the data included in the data packet in a cache area of a main memory. Thereupon, the accumulated size of the received data in the RAID controller becomes 16×A bytes.

Subsequently, the disk apparatus sends to the FC switch a data packet including the data item 2 with a data size of n+16×B+b bytes (n, B, and b are integral numbers equal to or greater than 0) (reference numeral (4) in FIG. 2). Note that n=16−a and b<16.

The FC switch, when receiving the data packet, decrypts according to the AES the data included in the data packet. The FC switch then combines the head of the received data with the data held in the internal memory and then decrypts it. In this way, the FC switch decrypts the data below 16 bytes thus combined.

Specifically, the FC switch combines the a-byte data stored in the internal memory with the head of the data item 2, decrypts the data of a+n+16×B bytes out of the combined data, and stores the remaining b-byte data in the internal memory. The FC switch then sends to the RAID controller a data packet including the decrypted data (reference numeral (5) in FIG. 2).

The disk apparatus, when receiving the data packet from the RAID controller, stores the data included in the data packet in the cache area of the main memory. Thereupon, the accumulated size of the received data in the RAID controller becomes 16×A+a+n+16×B bytes.

Further, the disk apparatus sends to the FC switch, as the final write data, a data item 3 with a data size of m+16×C+c (m, C, and c are integral numbers of equal to or greater than 0) (reference numeral (6) in FIG. 2). Note that m=16−b and c is a multiple of 16.

The FC switch combines the b-byte data held in the internal memory with the head of the data item 3, and decrypts data of b+m+16×C+c out of the combined data. The FC switch then sends to the RAID controller a data packet including the decrypted data (reference numeral (7) in FIG. 2).

The disk apparatus, when receiving the data packet from the RAID controller, stores the data included in the data packet in the cache area of the main memory. Thereupon, the accumulated size of the received data in the RAID controller becomes 16×A+a+n+16×B+b+m+16×C+c bytes.

In this way, the RAID controller stores all the data sent from the disk apparatus (data items 1, 2, and 3) in the cache memory of the main memory.

As such, the FC switch according to the present embodiment receives encrypted data from the disk apparatus, and decrypts, upon receiving it, the encrypted data in units of a decryption data size (data size as a unit for processing in the AES). If data below the decryption data size remains as a result of decryption, the FC switch combines the remaining data with encrypted data subsequently sent from the disk apparatus, decrypts the combined data in units of the decryption data size, and sends the decrypted data to the RAID controller.

With this arrangement, as in the FC, SAS, and AES, even when a data size as a unit for data transfer differs from a data size as a unit for crypto processing, all data to be transferred can be decrypted without interrupting data transfer.

Figure 3B:
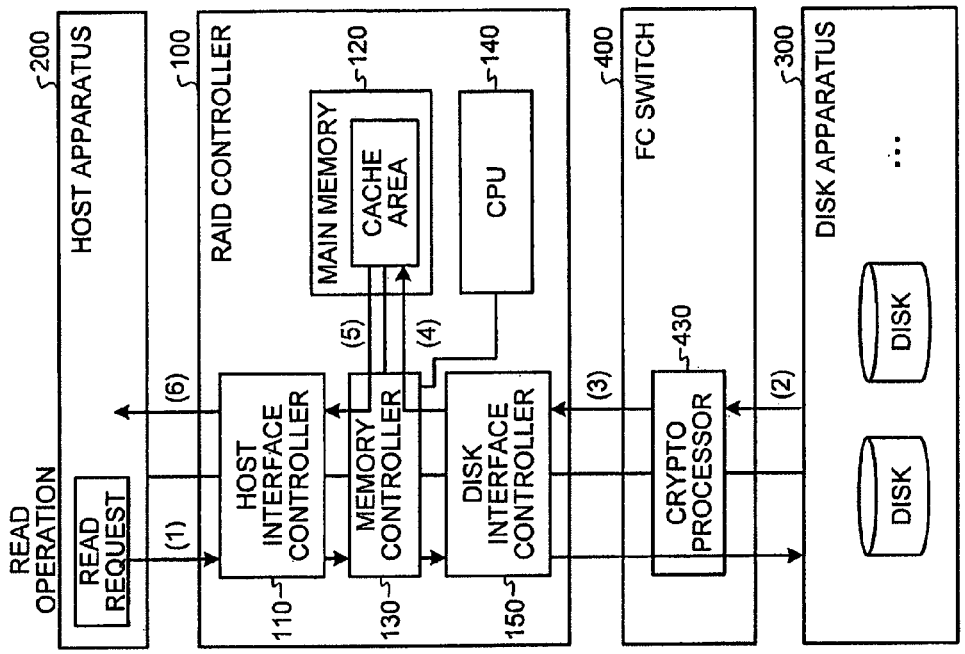
FIGS. 3A and 3B are functional block diagrams of a structure of a RAID system according to the present embodiment.
Figure 3A:
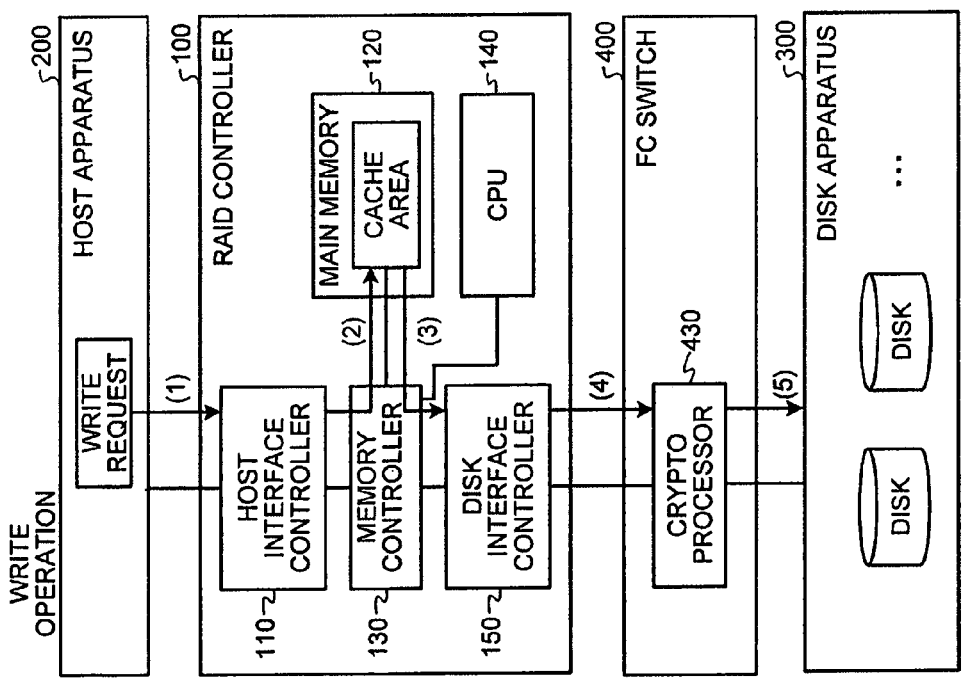

The following describes a RAID system using the FC switch according to the present embodiment. FIGS. 3A and 3B are functional block diagrams of a structure of a RAID system according to the present embodiment. As shown in FIGS. 3A and 3B, the RAID system is arranged such that a RAID controller 100 and a FC switch 400 are connected via FC (Fibre Channel) to a disk apparatus 300 that stores therein various kinds of data and to a host apparatus 200 that requests data write and read to and from the disk apparatus 300.

The RAID controller 100 is an apparatus that controls data input and output to and from the disk apparatus 300 according to instructions from the host apparatus 200. The RAID controller 100 includes a host interface controller 110 that controls data transfer to and from the host apparatus 200, a main memory 120 including a cache area used as a cache memory, a memory controller 130 that controls data read and write from and to the main memory 120, a central processing unit (CPU) 140 that implements firmware that controls the entire the RAID controller 100, and a disk interface controller 150 that controls data transfer to and from the disk apparatus 300.

The FC switch 400 is an apparatus that relays data transferred between the RAID controller 100 and the disk apparatus 300, and that encrypts and decrypts the data. The FC switch 400 includes a crypto processor 430 including an encryption chip using the AES.

The following briefly describes an operation of the RAID system. In write operation, as shown in FIG. 3A, when a write request is sent from the host apparatus 200 (reference numeral (1) in FIG. 3A), the host interface controller 110 receives data sent together with the write request, and passes it to the memory controller 130 in the RAID controller 100. The memory controller 130 sequentially stores the received data in the cache area of the main memory 120 (reference numeral (2) in FIG. 3A).

Then, the disk interface controller 150 sequentially reads out the data from the cache area via the memory controller 130 (reference numeral (3) in FIG. 3A), and sends the data thus read out to the FC switch 400 (reference numeral (4) in FIG. 3A). In the FC switch 400, the crypto processor 430 encrypts the received data, and sends it to the disk apparatus 300 (reference numeral (5) in FIG. 3A). The disk apparatus 300 writes the data sent from the crypto processor 430 to disks serving as storage media.

In read operation, on the other hand, as shown in FIG. 3B, when a read request is sent from the host apparatus 200 (reference numeral (1) in FIG. 3A), the disk apparatus 300 reads out requested data from the disks and sends it to the FC switch (reference numeral (2) in FIG. 3B). In the FC switch 400, when the data is sent from the disk apparatus 300, the crypto processor 430 decrypts the data and sends it to the RAID controller 100.

In the RAID controller 100, the disk interface controller 150 receives the data sent from the crypto processor 430 (reference numeral (3) in FIG. 3B), and sequentially stores the received data in the cache area of the main memory 120 via the memory controller 130 (reference numeral (4) in FIG. 3B). The host interface controller 110 reads out the decrypted data from the cache area via the memory controller 130 (reference numeral (5) in FIG. 3B), and transfers the data thus read out to the host apparatus 200 (reference numeral (6) in FIG. 3B).

The following describes the structure of the FC switch 400 shown in FIGS. 3A and 3B in greater detail. FIG. 4 is a functional block diagram of the FC switch 400 according to the present embodiment. As shown in FIG. 4, the FC switch 400 is connected to and shared between the RAID controller 100 and the disk apparatus 300 via FC.

To begin with, the RAID controller 100 is described. The RAID controller 100 performs data transfer using a protocol in the SCSI specification based on a request from the host apparatus 200.

Specifically, the RAID controller 100, when receiving a write request from the host apparatus 200, sends a write command packet to the FC switch 400. Further, when receiving a data transfer request packet from the FC switch 400 in response to the write command packet, the RAID controller reads out data from the cache area of the main memory 120 based on the data transfer request packet, and sends a data packet including the data thus read out to the FC switch 400.

On the other hand, the RAID controller 100, when receiving a read request from the host apparatus 200, sends a read command packet to the FC switch 400. Further, when receiving from the FC switch 400 a data packet including data requested in the read command packet, stores the data in the cache area of the main memory 120.

The following describes the disk apparatus 300. The disk apparatus 300 performs data transfer using a protocol in the SCSI specification, based on a command packet of various types sent from the RAID controller 100.

Specifically, when receiving a write command packet from the FC switch 400, the disk apparatus 300 checks a free space on disks $310_1$ to $310_n$, and sends to the FC switch 400 a data transfer request packet containing a receivable size indicating a receivable data size.

On the other hand, when receiving a read command packet from the FC switch 400, the disk apparatus 300 reads out data from the disks $310_1$ to $310_n$ based on the read command packet, and sends the data thus read out to the FC switch 400.

The following describes the FC switch 400. The FC switch 400 is a typical switch having a function of controlling data relay and communications paths between the apparatuses that perform communication via FC. The FC switch 400 includes a controller interface controller 410, a disk interface controller 420, and the crypto processor 430, as functional units particularly related to the present embodiment of the present invention.

The controller interface controller 410 is a processor that controls transmission and reception of data exchanged with the RAID controller 100 via FC. For example, the controller interface controller 410 receives from the RAID controller 100 a write command packet, a read command packet, a data packet, or the like, and sends to the RAID controller 100 a data packet, a data transfer request packet, or the like.

The disk interface controller 420 is a processor that controls transmission and reception of data exchanged with the disk apparatus 300 via FC. For example, the disk interface controller 420 sends to the disk apparatus 300 a write command packet or read command packet sent from the RAID controller 100, a data packet or data transfer request packet including data to be written to the disks $310_1$ to $310_n$, or the like. Further, the disk interface controller 420 receives from the disk apparatus 300 a data packet including data read out from the disks $310_1$ to $310_n$, or the like.

The crypto processor 430, including the encryption chip using the AES, is a processor that encrypts and decrypts data to be transferred between the RAID controller 100 and the disk apparatus 300. The following describes processes performed by the crypto processor 430, with regard to processes in write operation and processes in read operation.

In write operation, the crypto processor 430, when receiving a write command packet from the RAID controller 100, transfers it to the disk apparatus 300.

When receiving a data transfer request packet from the disk apparatus 300 in response to the write command packet thus transferred, the crypto processor 430 refers to a receivable size contained in the data transfer request packet, and calculates a new receivable size that is equal to or greater than the receivable size, and that is a multiple of an encryption data size (16 bytes).

The crypto processor 430 sets the calculated new receivable size in the data transfer request packet received from the disk apparatus 300, and sends it to the RAID controller 100.

When receiving the data from the RAID controller 100 in response to the data transfer request packet thus sent, the crypto processor 430 encrypts the data in units of 16 bytes that is a unit for processing in the AES, and sends it to the disk apparatus 300.

If data below 16 bytes remains as a result of encryption, the crypto processor 430 stores the data in its internal memory. Further, when receiving data subsequently sent from the RAID controller 100, the crypto processor 430 combines the head of the data with the data held in the internal memory, so as to encrypt the combined data.

The crypto processor 430, every time it encrypts data, calculates an accumulated size of the data having been encrypted. When the calculated accumulation becomes equal to the receivable size stored in the internal memory, the crypto processor 430 stores the subsequent data in the internal memory, without sending it to the disk apparatus 300.

Accordingly, data of the receivable size specified in the data transfer request packet is sent to the disk apparatus 300, so that the disk apparatus can send the next data transfer request packet to the RAID controller 100 via the FC switch 400.

The crypto processor 430, when receiving data from the RAID controller 100 in response to the next data transfer request packet sent from the disk apparatus 300, encrypts the data, then combines the head of the data with the data held in the internal memory, and transfers the combined data to the disk apparatus 300.

In read operation, on the other hand, when receiving a read command packet from the RAID controller 100, the crypto processor 430 transfers it to the disk apparatus 300.

When receiving the data transfer request packet from the disk apparatus 300 in response to the write command packet thus transferred, the crypto processor 430 decrypts the data in units of 16 bytes that is a unit for processing in the AES, and sends it to the RAID controller 100.

If data below 16 bytes remains as a result of encryption, the crypto processor 430 stores it in the internal memory. When receiving data subsequently sent from the disk apparatus 300, the crypto processor 430 combines the head of the data with the data held in the internal memory, so as to decrypt the combined data.

The foregoing describes the processes performed by the crypto processor 430 in write operation and those in read operation. The following describes processes commonly performed in the both operations.

As described, in the SCSI, when data to be transferred is greater than a predetermined size, data processed in a single command packet is separated into a plurality of packets and then transferred. Accordingly, when the RAID controller 100 can process a plurality of commands in parallel, mixed packets generated according to different commands are sent to the FC switch 400.

Thus, the crypto processor 430 needs to perform crypto processing by sorting the received packets by packet generated according to the same command.

In the FC, a FC frame header containing control information for controlling data transfer is added to a packet serving as a unit for data transfer. FIG. 5 is a schematic drawing of the format of a FC frame header. As shown in FIG. 5, various kinds of control information are set in a FC frame. Among these, "OX_ID" is assigned the same value for packets generated according to the same command.

The crypto processor 430, when receiving a write command packet or a read command packet from the RAID controller 100, stores in the internal memory "OX_ID" being set in the command. Further, when processing the data transfer request packet or the data packet, the crypto processor 430 determines whether "OX_ID" set in each packet matches the stored "OX_ID", so as to process only the one containing the matched "OX_ID".

While the present embodiment describes an arrangement using FC as an interface for connecting the RAID controller 100 and the disk apparatus 300, the present invention can be applied similarly to an arrangement using SAS as the interface.

In this arrangement, determination is performed similarly based on the information set in the SAS frame header added to each packet. FIG. 6 is a schematic drawing of the format of an SAS frame header. In the SAS, determination is performed similarly using "Tag" shown in FIG. 6.

In the FC and SAS, packets to be transferred are generally classified into control packets containing various commands, and data packets containing user data. Because the crypto processor 430 encrypts only user data contained in the data packets, it determines, upon receiving a packet, whether the packet is a control packet or a data packet so as to perform crypto processing only on a data packet.

Figure 7:
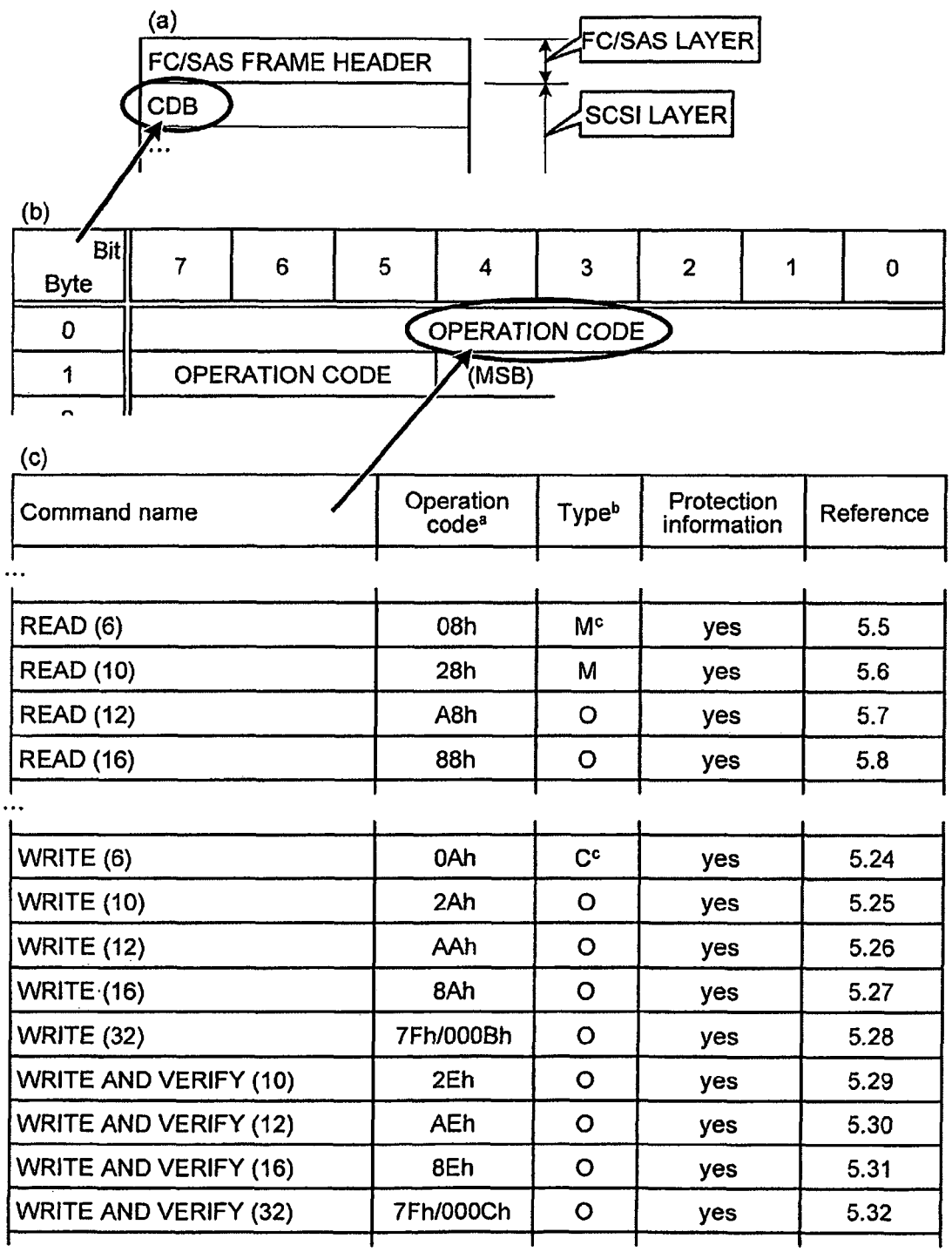
FIG. 7 is a diagram schematically explaining command information contained in the header of an SCSI layer.

In FC and SAS packets, the header of the SCSI layer is set in a field following the frame header. Based on command information contained in the header of the SCSI layer, the crypto processor 430 identifies a type of the packet. FIG. 7 is a schematic drawing of command information contained in the header of an SCSI layer. In FIG. 7, a portion (a) of the frame header of the FC and SAS is shown, and "CDB" is command information.

The command information contains a portion (b) representing "OPERATION CODE" indicating a command type as shown in FIG. 7. Further the "OPERATION CODE" contains a portion (c) representing various commands as shown in FIG. 7.

For example, when commands set in the "OPERATION CODE" contained in the packet are "READ (arbitrary numerical value)", "WRITE (arbitrary numerical value)", or "WRITE AND VERIFY (arbitrary numerical value)", the crypto processor 430 determines that the packet is a data packet containing user data to be read out or written, and performs crypto processing.

Figure 8:
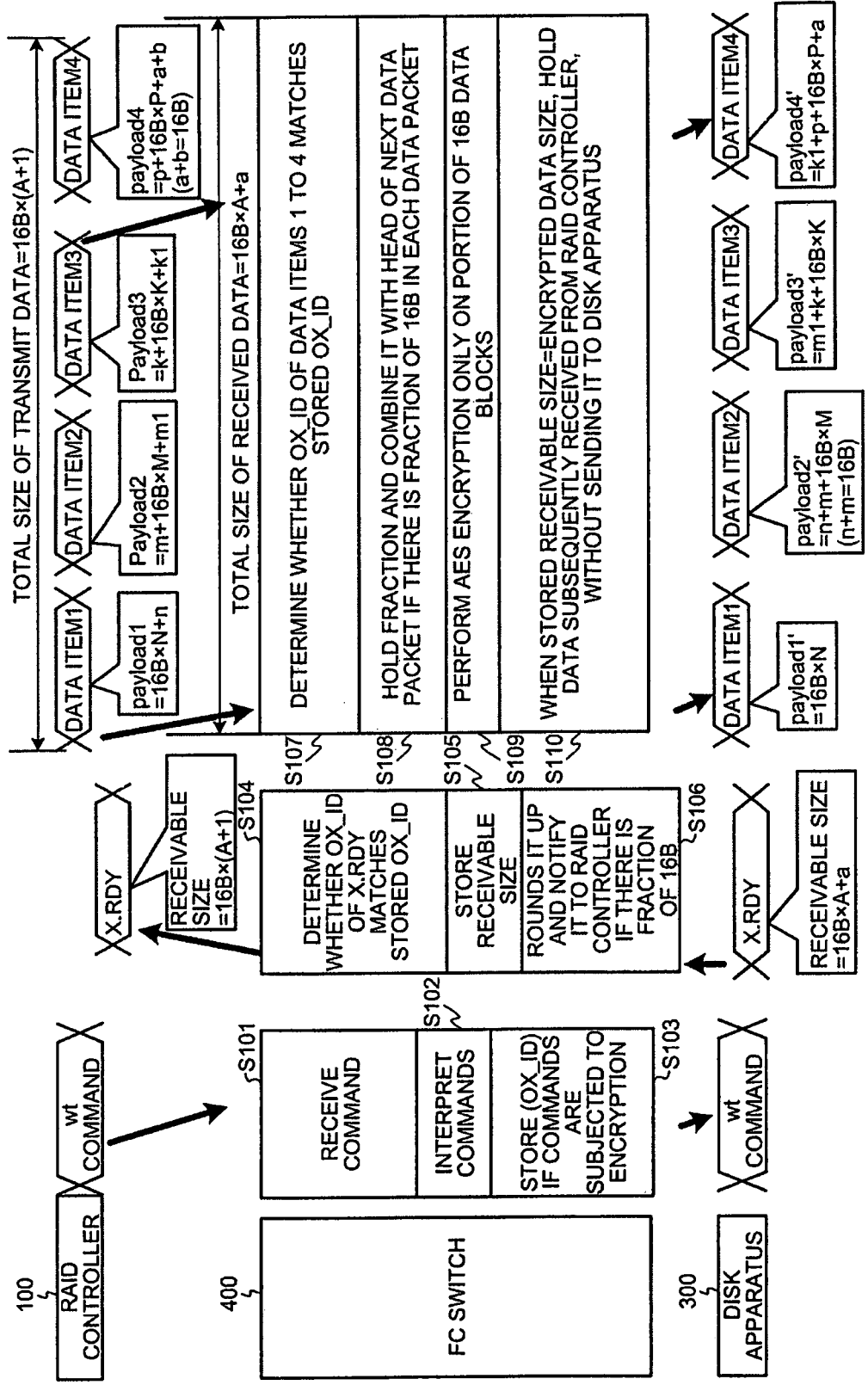
FIG. 8 is a schematic diagram of a processing procedure performed by the FC switch in write operation.
Figure 9:
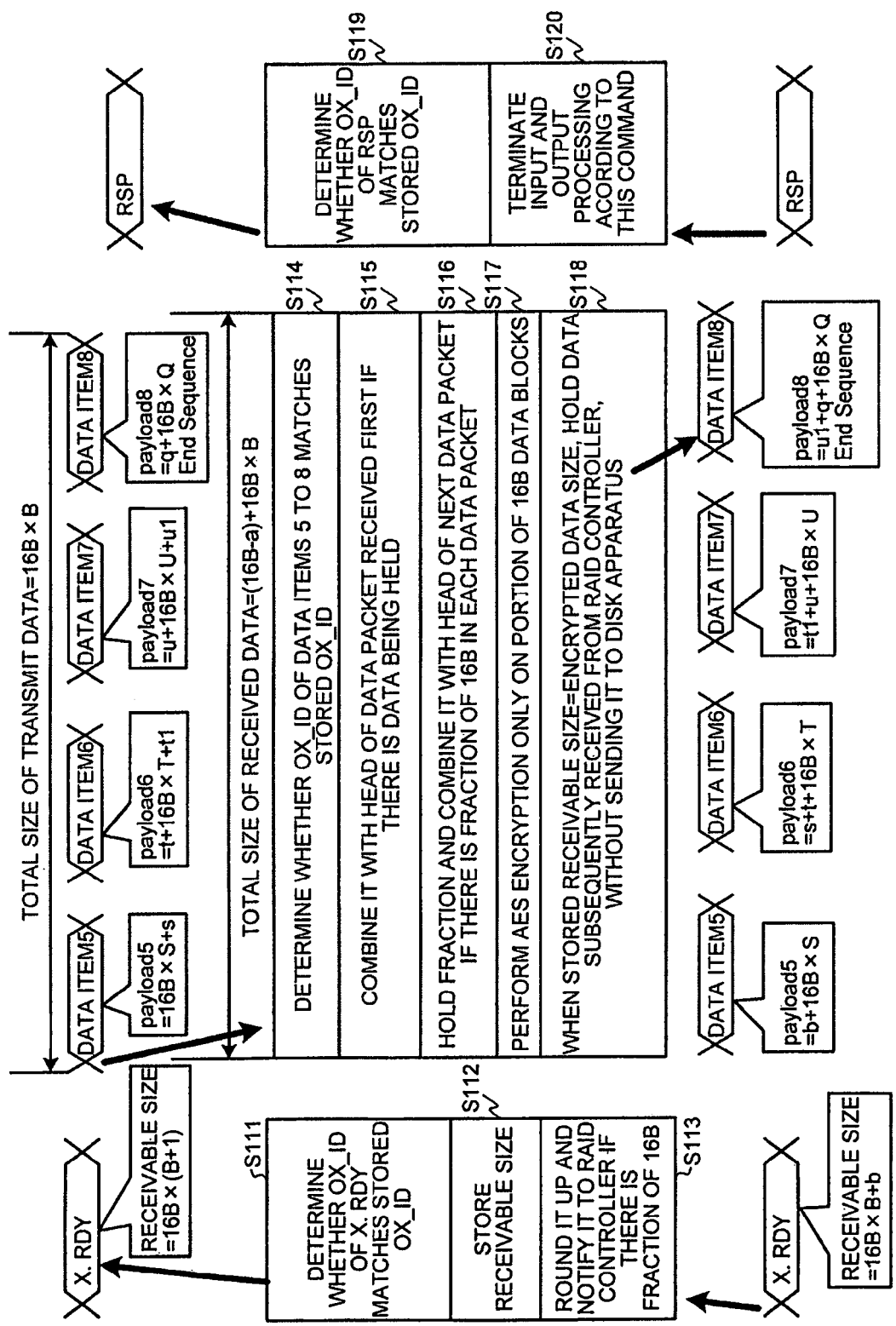
FIG. 9 is a schematic diagram of a processing procedure of the FC switch in write operation.
Figure 10:
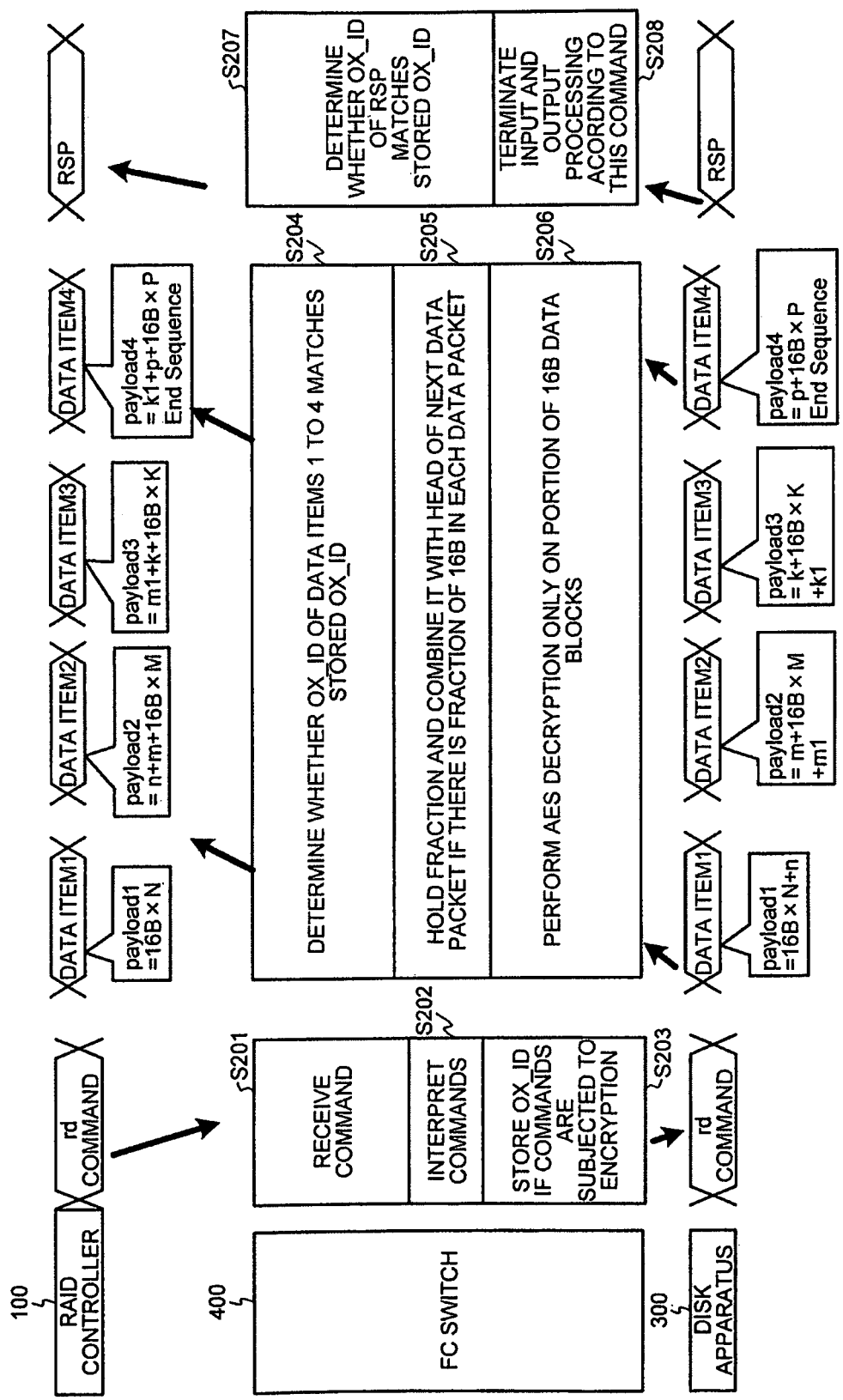
FIG. 10 is a schematic diagram of a processing procedure of the FC switch in read operation.
Figure 11B:
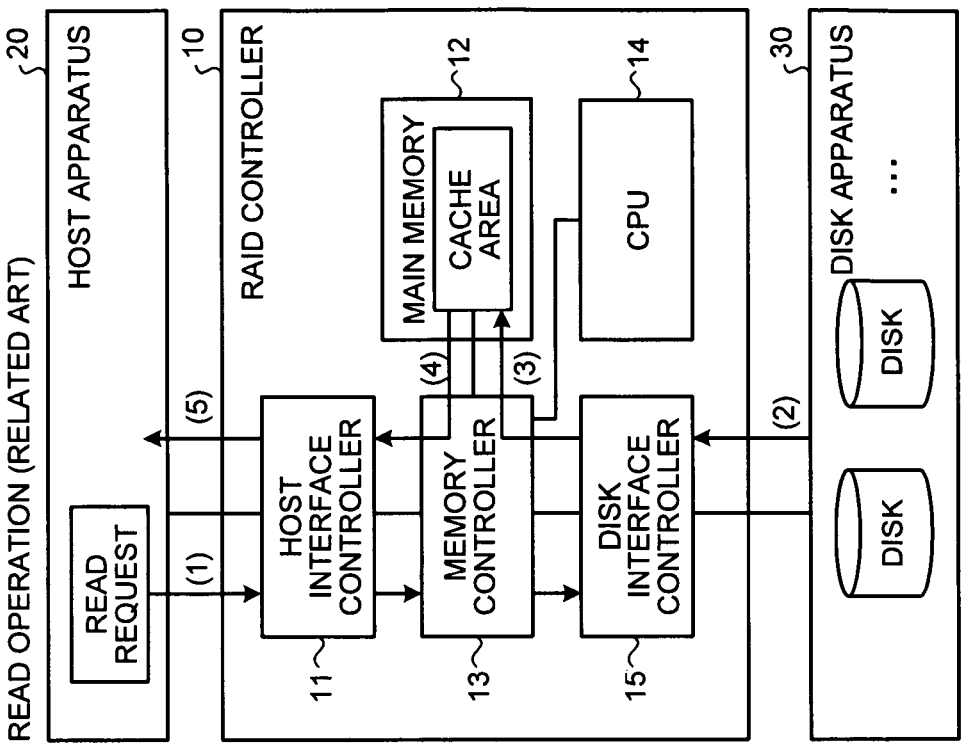
FIGS. 11A and 11B are functional block diagrams of a conventional RAID system.
Figure 11A:
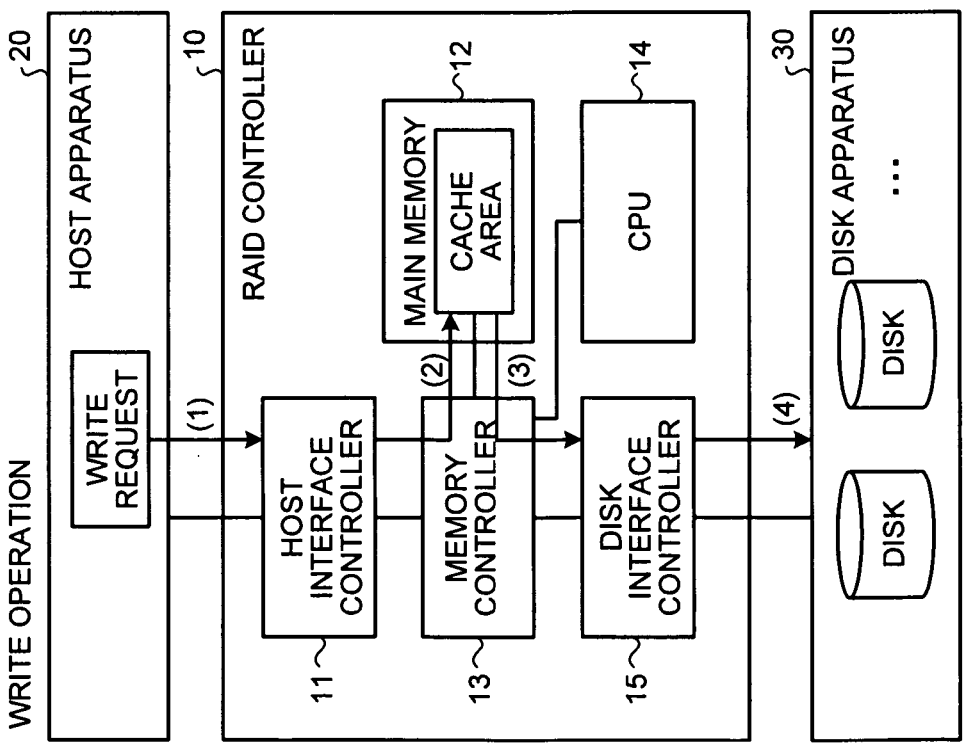
Figure 12:
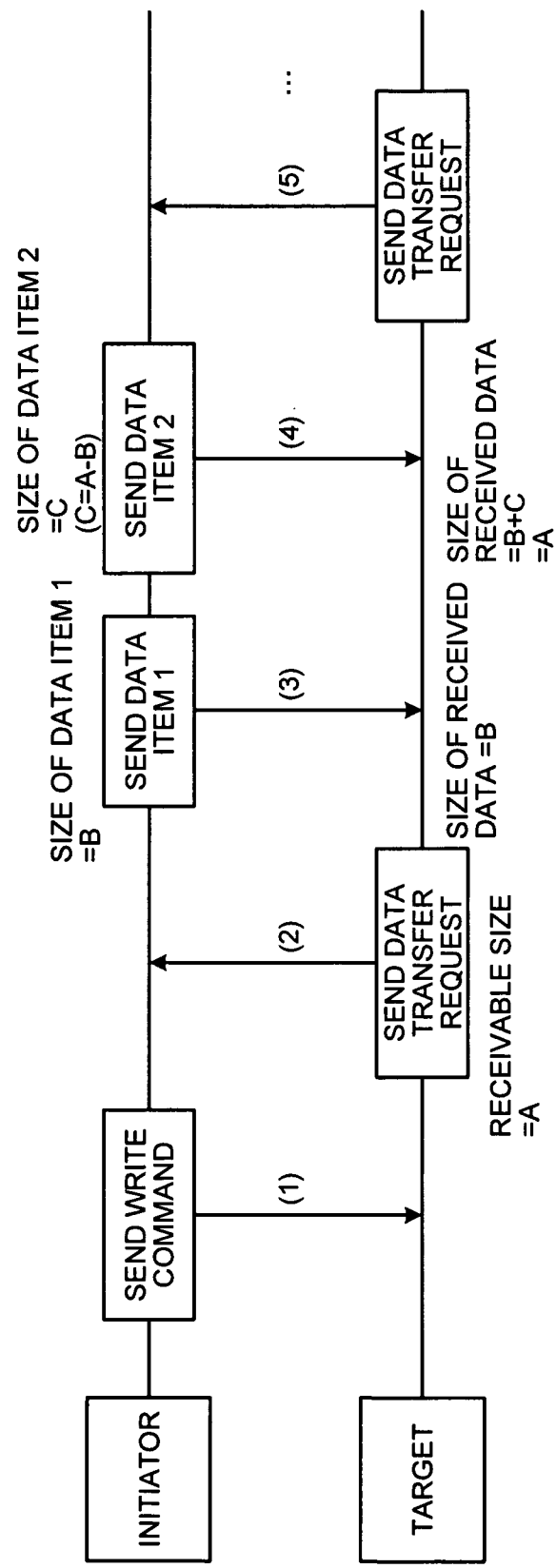
FIG. 12 is a schematic diagram for explaining data transfer via SCSI.

The following describes processing procedures performed by the FC switch 400 according to the present embodiment, starting with a processing procedure performed by the FC switch 400 in write operation referring to FIGS. 8 and 9, and then that in read operation referring to FIG. 10.

A processing procedure performed by the FC switch 400 in write operation is described. FIGS. 8 and 9 are schematic diagrams of a processing procedure performed by the FC switch 400 in write operation.

As shown in FIG. 8, in write operation, the FC switch 400, when receiving a write command packet (wt command) from the RAID controller 100 (Step S101), interprets commands contained in the header of the SCSI layer of the received packet (Step S102), so as to determine whether the commands are subjected to encryption.

If the commands are subjected to encryption, the FC switch 400 stores therein "OX_ID" contained in the frame header of the packet (Step S103), and sends the write command packet to the disk apparatus 300.

The FC switch 400, when receiving a data transfer request packet (X.RDY) from the disk apparatus 300, determines whether the "OX_ID" contained in the frame header of the received packet matches the stored "OX_ID" (Step S104).

If there is a match, the FC switch 400 stores therein a receivable size contained in the data transfer request packet (Step S105). Then, FC switch 400 establishes a new receivable size that is equal to or greater than the receivable size, and that is a multiple of 16 bytes, and sets the established receivable size in the data transfer request packet, thereby notifying it to the RAID controller 100 (Step S106).

For example, as shown in FIG. 8, if the receivable size contained in the data transfer request packet is 16×A+a bytes, the FC switch 400 notifies a new receivable size of 16×(A+1) bytes to the RAID controller.

When receiving data packets (DATA items 1 to 4) from the RAID controller 100 in response to the data transfer request packet, the FC switch 400 determines whether "OX_ID" contained in the frame header of each of the packets matches the stored "OX_ID" (Step S107).

If there is a match, the FC switch 400 interprets user data contained in the data packet. Then, if there is a fraction of 16 bytes (i.e. a remainder of division by 16 bytes), the FC switch 400 stores therein data of the fraction. In this case, when receiving the next data packet, the FC switch 400 combines the head of the packet with the fraction data being held (Step S108).

Further, the FC switch 400 performs AES encryption only on a portion of the data, i.e., 16-byte blocks of the data, and sends it to the disk apparatus 300 (Step S109). When the receivable size stored at Step S105 becomes equal to the encrypted data size, the FC switch 400 stores therein the data subsequently received from the RAID controller 100 without sending it to the disk apparatus 300 (Step S110).

Accordingly, the disk apparatus 300 receives data of the receivable size set in the data transfer request packet. For example, the disk apparatus 300 receives data of 16×A+a bytes, as shown in FIG. 8.

As shown in FIG. 9, when receiving the next data transfer request packet from the disk apparatus 300, the FC switch 400 performs processes similar to those at Steps S104 to S106, and sends to the RAID controller 100 a data transfer request packet containing a new receivable size (Steps S111 to S113).

When receiving data packets (DATA 5 to DATA 8) from the RAID controller 100 in response to the data transfer request packet, the FC switch 400 determines whether "OX_ID" contained in the frame header of each of the packets matches the stored "OX_ID" (Step S114).

If there is a match, the FC switch 400 checks whether unsent data (see Step S110) has been stored. If it has been stored, the FC switch 400 combines the unsent data with the head of user data contained in the data packet received first (Step S115).

The FC switch 400 interprets user data contained in the data packet, and, if there is a fraction of 16 bytes, stores therein data of the fraction. In this case, when receiving the next data packet, the FC switch 400 combines the head of the packet with the fraction data being stored (Step S116).

The FC switch 400 performs AES encryption only on a portion of the data, i.e., 16-byte blocks of the data, and sends it to the disk apparatus 300 (Step S117). When the receivable size stored at Step S105 becomes equal to the encrypted data size, the FC switch 400 stores therein data subsequently received from the RAID controller 100, without sending it to the disk apparatus 300 (Step S118).

Upon receiving a data packet containing "End Sequence" information indicating the final data item, if the FC switch 400 also receives an end command (RSP) from the disk apparatus 300, it determines whether "OX_ID" contained in the frame header of the received packet matches the stored "OX_ID" (Step S119).

If there is a match, the FC switch 400 terminates the input and output processing according to the write command (Step S120).

The following describes a processing procedure performed by the FC switch 400 in read operation. FIG. 10 is a schematic drawing of a processing procedure performed by the FC switch 400 in read operation.

As shown in FIG. 10, in read operation, the FC switch 400, when receiving a read command (rd command) packet from the RAID controller 100 (Step S201), interprets commands contained in the header of an SCSI layer of the received packet (Step S202), and determines whether the commands are subjected to decryption.

If the commands are subjected to decryption, the FC switch 400 stores therein "OX_ID" contained in the frame header of the packet (Step S203), and sends the read command packet to the disk apparatus 300.

When receiving data packets (DATA items 1 to 4) from the disk apparatus 300 in response to the read command packet, the FC switch 400 determines whether "OX_ID" contained in the frame header of each of the data packets matches the stored "OX_ID" (Step S204).

If there is a match, the FC switch 400 interprets user data contained in the data packet. Then, if there is a fraction of 16 bytes, the FC switch 400 stores therein data of the fraction. In this case, when receiving the next data packet, the FC switch 400 combines the head of the packet with the fraction data being held (Step S205).

The FC switch 400 performs AES decryption only on a portion of the data, i.e., 16-byte blocks of the data, and sends it to the RAID controller 100 (Step S206).

Upon receiving a data packet containing End Sequence information indicating the final data item, if the FC switch 400 also receives an end command packet (RSP) from the disk apparatus 300, it determines whether "OX_ID" contained in the frame header of the received packet matches the stored "OX_ID" (Step S207).

If there is a match, the FC switch 400 terminates the input and output processing according to the read command (Step S208).

As described, in the present embodiment, the FC switch 400, when receiving from the disk apparatus 300 a data transfer request packet containing information of a first receivable size indicating a receivable data size, establishes a second receivable size that is equal to or greater than the first receivable size, and that is a multiple of the encrypted data size. Then, the FC switch 400 sends to the RAID controller 100 the data transfer request packet containing the second receivable size thus established. In response to the data transfer request packet thus sent, the FC switch 400 receives a data packet containing data of the second receivable size from the RAID controller 100, encrypts the data in units of an encryption data size, and sends to the disk apparatus 300 the encrypted data in units of the first receivable size. If unsent data below the first receivable size remains as a result of transmission, the FC switch 400 combines the unsent data with data subsequently encrypted, and sends to the disk apparatus 300 a data packet containing the combined data. As a result, data of the first receivable size specified in the data transfer request packet is sent to the disk apparatus 300, so that the disk apparatus 300 can send the next data transfer request packet. This enables encryption to be performed without interrupting data transfer, even when a data size as a unit for data transfer differs from a data size as a unit for crypto processing.

In the present embodiment, as a result of encrypting data contained in a data packet sent from the RAID controller 100, if data below an encryption data size remains, the FC switch 400 combines the remaining data with data contained in a data packet subsequently sent from the RAID controller 100, so as to encrypt the combined data in units of the encryption data size. This enables encryption of all data to be transferred without interrupting data transfer, even when a data size as a unit for data transfer differs from a data size as a unit for crypto processing.

In the present embodiment, when a data packet sent from the RAID controller 100 contains "OX_ID" that is the same value assigned for successive data items, and when the FC switch 400 combines the remaining data with data subsequently sent from the RAID controller 100, it combines them based on "OX_ID". This allows encryption of each data item even when successive data items are transferred in parallel.

In the present embodiment, when a data packet sent from the RAID controller 100 contains command information indicating a type of data, and when the FC switch 400 encrypts the data contained in the data packet offered as a response from the RAID controller 100, the FC switch 400 determines, based on the command information, whether to encrypt the data. If the FC switch 400 determines to perform encryption, it encrypts the data. This enables sorting of the data into data requiring encryption and data not requiring encryption, for example, allowing encryption of only user data without encrypting control data.

In the present embodiment, the FC switch 400 receives a data packet from the disk apparatus 300, and decrypts, upon receiving the data packet, encrypted data contained in the data packet in units of a decryption data size. If data below the decryption data size remains as a result of decryption, the FC switch 400 combines the remaining data with encrypted data subsequently sent from the disk apparatus 300, decrypts the combined data in units of decryption data size, and sends the decrypted data to the RAID controller 100. This enables decryption of all data to be transferred without interrupting data transfer, even when a data size as a unit for data transfer differs from a data size as a unit for crypto processing.

In the present embodiment, when encrypted data contained in a data packet sent from the disk apparatus 300 contains "OX_ID" that is the same value assigned for successive data items, and when the remaining data is combined with encrypted data subsequently sent from the disk apparatus 300, these data items are combined based on "OX_ID". This enables encryption of each data item even when successive data items are transferred in parallel.

In the present embodiment, when a data packet sent from the disk apparatus 300 contains command information indicating a type of data, and when the FC switch 400 decrypts encrypted data contained in the data packet sent from the disk apparatus 300, the FC switch 400 determines, based on the command information, whether to decrypt the encrypted data. If the FC switch 400 determines to perform decryption, it decrypts the encrypted data. This enables sorting of the data into data requiring encryption and data not requiring encryption, for example, allowing encryption of only user data without encrypting control data.

While the present embodiment describes an arrangement that the present invention is applied to the FC switch 400, the present invention is not limited to this arrangement, and may be arranged such that the RAID controller 100 and the disk apparatus 300 have the functions of the crypto processor 430.

According to an embodiment of the present invention, data of a first receivable size specified in a data transfer request is sent to a second apparatus, so that the second apparatus can send a next data transfer request. This yields such an advantage as realizing encryption without interrupting data transfer, even when a data size as a unit for data transfer differs from a data size as a unit for crypto processing.

According to an embodiment of the present invention, such an advantage is yielded that all data to be transferred can be encrypted without interrupting data transfer, even when a data size as a unit for data transfer differs from a data size as a unit for crypto processing.

According to an embodiment of the present invention, such an advantage is yielded that even when a plurality of successive data items are transferred in parallel, encryption can be performed on each data item.

According to an embodiment of the present invention, such an advantage is yielded as sorting the data into data requiring encryption and data not requiring encryption, for example, allowing encryption of only user data without encrypting control data.

According to an embodiment of the present invention, such an advantage is yielded that all data to be transferred can be decrypted without interrupting data transfer, even when a data size as a unit for data transfer differs from a data size as a unit for crypto processing.

According to an embodiment of the present invention, such an advantage is yielded that even when a plurality of successive data items are transferred in parallel, decryption can be performed on each data item.

According to an embodiment of the present invention, such an advantage is yielded as sorting the data into data requiring encryption and data not requiring encryption, for example, allowing encryption of only user data without encrypting control data.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A data encryption apparatus for encrypting, in a unit of a predetermined encryption data size, data transferred from a first apparatus to a second apparatus, the data encryption comprising:
a transfer request sending unit that establishes, upon receiving from the second apparatus a first data transfer request indicating a first receivable size, a second receivable size being equal to or greater than the first receivable size and being a multiple of the predetermined encryption data size, and that sends to the first apparatus a second data transfer request indicating the second receivable size thus established;
a data encrypting unit that receives data of the second receivable size from the first apparatus in response to the second data transfer request sent by the transfer request sending unit, and that encrypts, in the unit of the predetermined encryption data size, the data received from the first apparatus; and
a data sending unit that sends the data encrypted by the data encrypting unit to the second apparatus in units of the first receivable size, and upon remaining unsent data below the first receivable size after the data sending unit that sends the data, the data sending unit combining the unsent data with subsequent encryption data and sending the combined data to the second apparatus, the subsequent encryption data being subsequently encrypted by the data encrypting unit, wherein the data sent from the first apparatus contains data type information indicating a type of the data, and the data encrypting unit determines based on the data type information whether to encrypt the data, and encrypts the data upon determining to perform encryption, wherein
the data sent from the first apparatus contains data type information indicating a type of the data, and the data encrypting unit determines based on the data type information whether to encrypt the data, and encrypts the data upon determining to perform encryption.

2. The data encryption apparatus according to claim 1, wherein the data encrypting unit combines data below the predetermined encryption data size remaining as a result of encrypting the data sent from the first apparatus with a subsequent transmission data that is subsequently sent from the first apparatus, so as to encrypt the combined data with the unsent data the subsequent transmission data in units of the encryption data size.

3. The data encryption apparatus according to claim 2, wherein the data sent from the first apparatus contains input and output identification information assigned the same value for successive data items, and the data encrypting unit combines the remaining data with data subsequently sent from the first apparatus when input and output identification information of data that includes the unsent data matches input and output identification information of the subsequent transmission data.

4. A data decryption apparatus for decrypting, in a unit of a predetermined decryption data size, encrypted data transferred from a second apparatus to a first apparatus, comprising:
a data decrypting unit that decrypts the encrypted data in the unit of the predetermined decryption data size, and upon remaining data below the predetermined decryption data size as a result of decryption, the data decrypting unit storing the remaining data in a storing unit and combining the remaining data in the storing unit with encrypted data subsequently sent from the second apparatus, so as to decrypt the combined data in units of the decryption data size; and
a data sending unit that sends to the first apparatus the data decrypted by the data decrypting unit, wherein
the encrypted data sent from the second apparatus contains data type information indicating a type of the data, and the data decrypting unit determines based on the data type information whether to decrypt the encrypted data, and decrypts the encrypted data upon determining to perform decryption.

5. The data decryption apparatus according to claim 4, wherein the encrypted data sent from the second apparatus contains input and output identification information assigned the same value for successive data items, and the data decrypting unit combines, based on the input and output identification information, the remaining data with encrypted data subsequently sent from the second apparatus.

6. A data encryption method for encrypting, in a unit of a predetermined encryption data size, data transferred from a first apparatus to a second apparatus, the data encryption method comprising:
establishing, upon receiving from the second apparatus a first data transfer request indicating a first receivable size, a second receivable size being equal to or greater than the first receivable size and being a multiple of the predetermined encryption data size;
sending to the first apparatus a second data transfer request indicating the second receivable size thus established;
receiving data of the second receivable size from the first apparatus in response to the second data transfer request;
encrypting, in the unit of the predetermined encryption data size, the data received from the first apparatus;
sending the encrypted data to the second apparatus in units of the first receivable size; and
upon remaining unsent data below the first receivable size after the sending the encrypted data sends the data, combining the unsent data with subsequent encryption data and sending the combined data to the second apparatus, the subsequent encryption data being encrypted by the encrypting subsequent to the remaining unsent data, wherein
the data sent from the first apparatus contains data type information indicating a type of the data, and the data encrypting unit determines based on the data type information whether to encrypt the data, and encrypts the data upon determining to perform encryption.

7. The data encryption method according to claim 6, further comprising: combining data below the predetermined encryption data size remaining as a result of encrypting the data sent from the first apparatus with a subsequent transmission data that is subsequently sent from the first apparatus, so as to encrypt the combined data with the unsent data the subsequent transmission data in units of the encryption data size.

8. A data decryption method for decrypting, in a unit of a predetermined decryption data size, encrypted data transferred from a second apparatus to a first apparatus, the data decryption method comprising:
- decrypting the encrypted data in the unit of the predetermined decryption data size;
- upon remaining data below the predetermined decryption data size as a result of decryption, storing the remaining data in a storing unit and combining the remaining data in the storing unit with encrypted data subsequently sent from the second apparatus, so as to decrypt the combined data in units of the decryption data size; and
- sending to the first apparatus the data decrypted by the decrypting, wherein
- the encrypted data sent from the second apparatus contains data type information indicating a type of the data, and the decrypting determines based on the data type information whether to decrypt the encrypted data, and decrypts the encrypted data upon determining to perform decryption.

* * * * *

UNITED STATES PATENT AND TRADEMARK OFFICE
CERTIFICATE OF CORRECTION

| | | |
|---|---|---|
| PATENT NO. | : 8,478,984 B2 | Page 1 of 1 |
| APPLICATION NO. | : 12/004430 | |
| DATED | : July 2, 2013 | |
| INVENTOR(S) | : Terumasa Haneda | |

It is certified that error appears in the above-identified patent and that said Letters Patent is hereby corrected as shown below:

In the Claims

Column 17, Lines 57-62, In Claim 1, delete "encryption, wherein the data sent from the first apparatus contains data type information indicating a type of the data, and the data encrypting unit determines based on the data type information whether to encrypt the data, and encrypts the data upon determining to perform encryption" and insert -- encryption. --, therefor.

Signed and Sealed this
Fourth Day of March, 2014

Michelle K. Lee
*Deputy Director of the United States Patent and Trademark Office*